Sept. 30, 1969  E. PRIESTLEY  3,469,550

STABILIZATION SYSTEMS

Filed Aug. 9, 1967  3 Sheets-Sheet 1

INVENTOR
ERIC PRIESTLEY
BY
ATTORNEY

Sept. 30, 1969    E. PRIESTLEY    3,469,550
STABILIZATION SYSTEMS
Filed Aug. 9, 1967    3 Sheets-Sheet 2

INVENTOR
ERIC PRIESTLEY
BY
ATTORNEY

United States Patent Office 3,469,550
Patented Sept. 30, 1969

3,469,550
STABILIZATION SYSTEMS
Eric Priestley, Lewisham, London, England, assignor to Elliot Brothers (London) Limited, London, England, a British Company
Filed Aug. 9, 1967, Ser. No. 659,457
Claims priority, application Great Britain, Aug. 10, 1966, 35,874
Int. Cl. B63b *1/28, 39/06*
U.S. Cl. 114—66.5
2 Claims

ABSTRACT OF THE DISCLOSURE

A hydrofoil vehicle having sensors sensing pitch, roll and heave of the vehicle and control means to combine the outputs of the sensors so as to control the control surfaces of the vehicle to reduce pitch, roll and heave of the vehicle.

---

The invention relates to stabilization systems in particular for use with vehicles having controlling hydrofoils.

An object of the present invention is to provide an improved stabilization system for such vehicles.

A further object of the invention is to provide control for such a vehicle in at least two modes of movement (such as pitch and heave, for example) wherein control in each mode individually does not affect operation in the other mode.

Accordingly in a particular embodiment the invention provides in a hydrofoil vehicle having first, second, third, and fourth adjustable foils, a stabilization system comprising a first accelerometer mounted substantially at the centre of gravity of the hydrofoil vehicle to sense motion in heave, a second accelerometer mounted adjacent a said adjustable foil, to sense motion in heave and pitch, a pitch rate gyroscope mounted substantially at the centre of gravity of the hydrofoil vehicle to sense motion in pitch, a roll rate gyroscope mounted substantially at the center of gravity of the hydrofoil vehicle to sense motion in roll, a first shaper for shaping the output of the first accelerometer, a second shaper for shaping the output of the second accelerometer, a third shaper for shaping the output of the pitch rate gyroscope, a fourth shaper for shaping the output of the roll rate gyroscope, combining means for combining the outputs of the first, second, third and fourth shapers in different proportions to provide first, second, third and fourth demand signals representative of the desired position of respective ones of said first, second, third and fourth adjustable foils, and actuator means responsive to said first, second, third and fourth demand signals to vary said first, second, third and fourth foils respectively in dependence thereon to tend to reduce movement of the hydrofoil vehicle in heave, pitch and roll.

In the case of a hydrofoil vehicle the stabilization systems according to the invention can be arranged to angularly adjust the foils themselves to provide control of the hydrofoil vehicle over the water. Instead, flaps appended to the foils can be adjusted to provide control.

A hydrofoil vehicle embodying the invention will now be described, by way of example, with reference to the accompanying diagrammatic drawings in which.

Figure 3A:
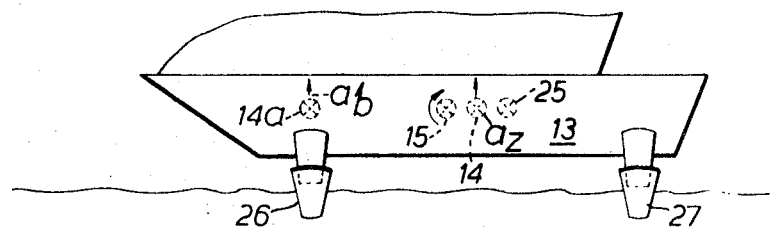
Figure 3B:
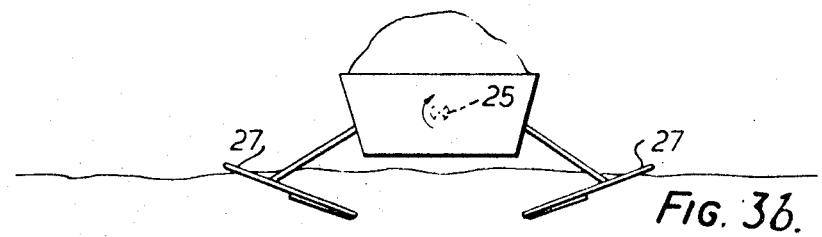
Figure 4:
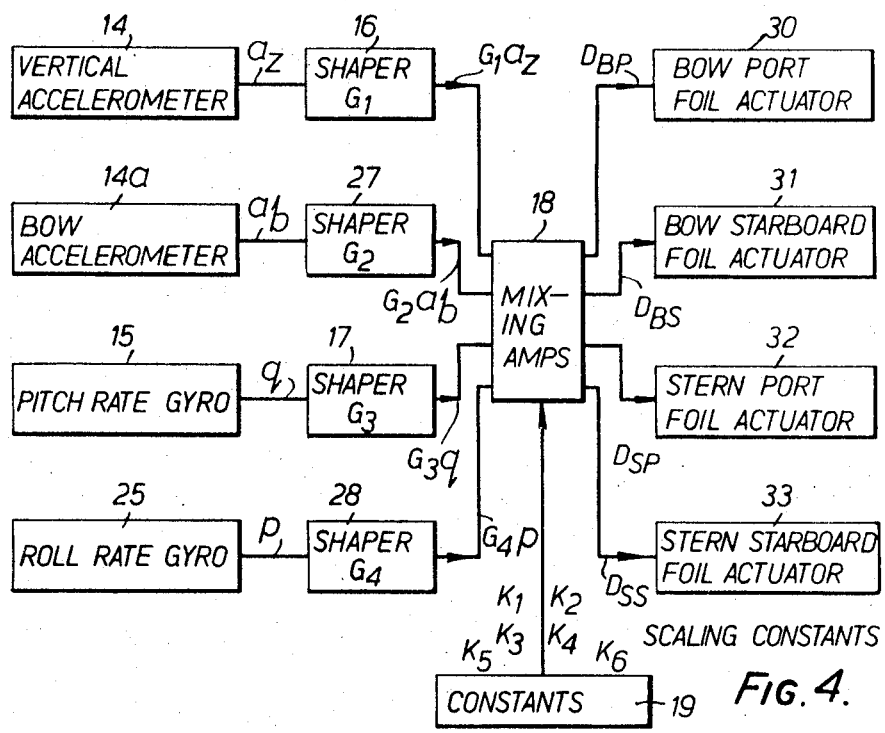
Figure 5:
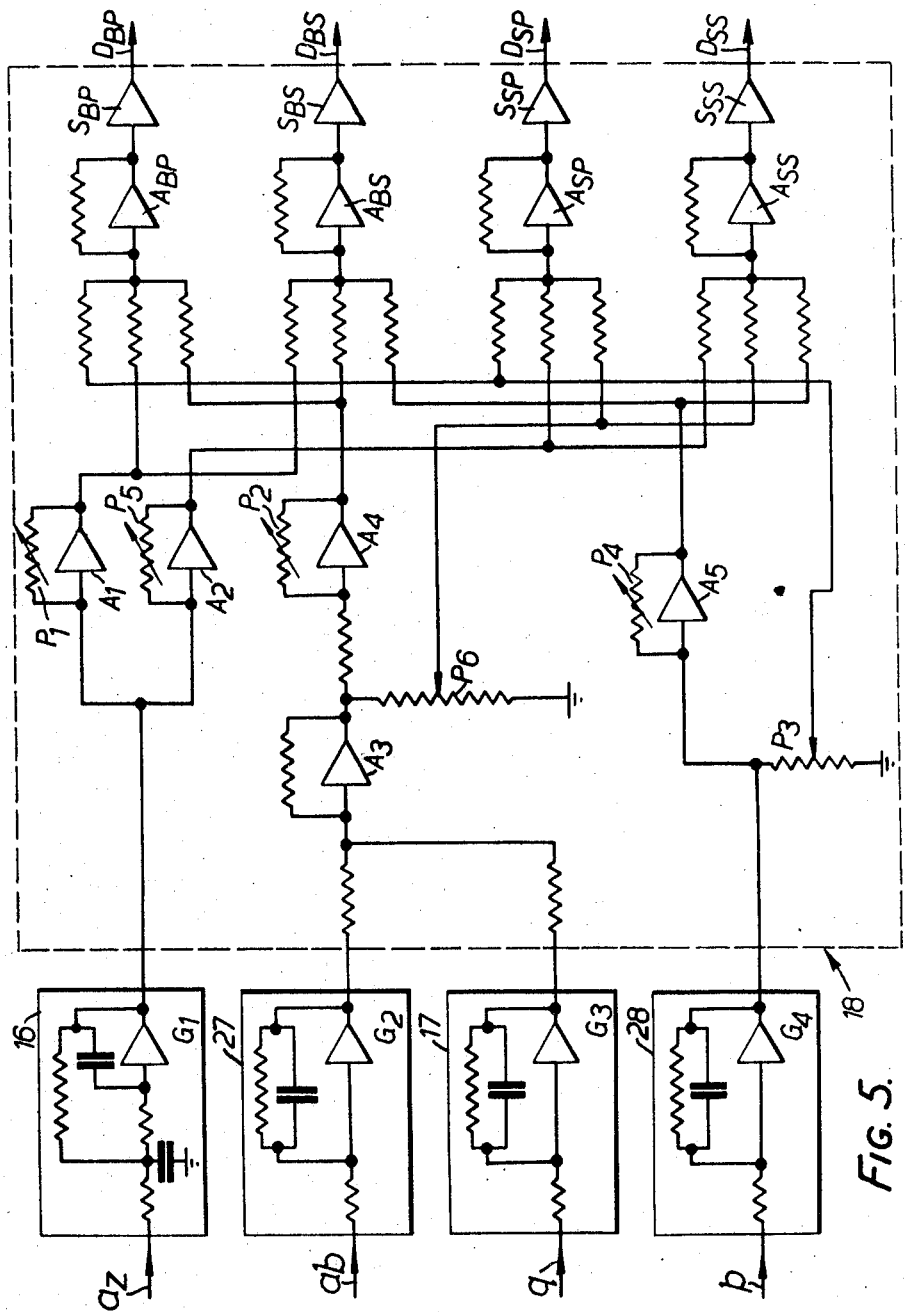

FIGURES 3a and 3b respectively show a side and end elevation of a modified hydrofoil vehicle embodying the invention;

FIGURE 4 shows a block diagram of a stabilizing system incorporated in the modified hydrofoil vehicle of FIGURES 3a and 3b; and FIGURE 5 shows a circuit diagram of part of the system of FIGURE 4.

Figure 1:
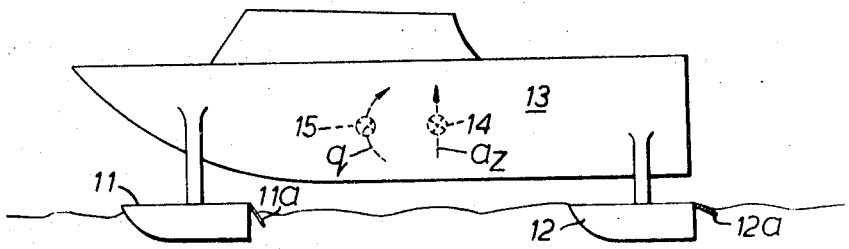
FIGURE 1 shows a side elevation view of the hydrofoil vehicle.

Referring now to FIGURE 1 there is shown a hydrofoil vehicle having bow and stern foils 11 and 12 respectively, each having respective trailing edge flaps or elevators 11a, 12a. Housed in the hull 13 of the hydrofoil vehicle is an accelerometer 14 aligned so as to read vertical acceleration and positioned substantially at the centre of gravity of the hydrofoil vehicle. Also housed in the hull 13 of the hydrofoil vehicle is a pitch rate gyroscope 15 aligned so as to provide an output representative of angular velocity in pitch, i.e. pitch rate, of the hydrofoil vehicle. Therefore, the accelerometer 14 and the rate gyroscope 15 respectively provide signals representative of two different modes of oscillation ("heave" and "pitch") of the vertical accelerometer 14 and pitch rate gyroscope 15 to stabilize the hydrofoil vehicle, which outputs are fed via respective shapers 16 and 17 to provide two inputs for mixing amplifiers 18. Further inputs for the mixing amplifiers 18 are derived from an arrangement 19 for producing adjustable constants.

An output from the mixing amplifiers 18 representative of bow foil flap angle demand is fed via a power amplifier 21 and an actuator 22 to control the position of the bow foil flap 11a. A further output from the mixing amplifiers 18 representative of stern foil flap angle demand is fed via a power amplifier 23 and an actuator 24 to the stern foil flap 12a.

The shaper 16 is in the form of a low pass filter designed to give about 90° or slightly greater phase lag at the natural frequency in heave of the hydrofoil vehicle. This filter also attenuates unwanted high frequency components of the accelerometer output. The shaper 17 is in the form of a high pass or band pass filter designed to produce appreciable lead at the natural frequency in pitch of the hydrofoil.

The arrangement 19 produces constants signals $k_1$ and $k_2$ which determine the ratio between the amplitude movement of the bow foil flap 11a and of the stern foil flap 12a, the constant signal $k_1$ relating to heave stabilization and the constant $k_2$ relating to pitch stabilization. In practice, the constants $k_1$ and $k_2$ can be determined from simple calm-water trials, the constant $k_1$ being determined by first operating the bow and stern foil flaps sinusoidally in phase and determining the desired ratio of amplitudes $k_1$ as that giving a minimum of pitching at the frequency which gives maximum heaving and secondly operating the bow and stern foil flaps sinusoidally in antiphase and determining the desired ratio $k_2$ of amplitudes as that giving a minimum of heaving at the frequency which gives maximum pitching.

As previously stated, the mixing amplifiers 18 produce two outputs which are the bow and stern foil flap angle demands:

Bow foil flap angle demand ........... $-k_1 g_1 a_z - k_2 g_2 q$
Stern foil flap angle demand .......... $-g_1 a_z + g_2 q$ Where $a_z$ is the output from the vertical accelerometer 14, $g_1$ is a the complex transfer function of shaper 16, $q$ is the output from the rate gyroscope 15 and $g_2$ is the complex transfer function of shaper 17. The constant components are positive, positive heave acceleration being upwards, positive pitch rate being bows up, and flap angles being positive trailing edge down. Hence in operation of the system, unit positive heave acceleration demands the stern foil flap 12a to move angle $g_1$ up, and bow foil flap 11a to move angle $k_1 g_1$ up: unit positive pitch rate demands the stern foil flap 12a to move angle $g_2$ down, and bow foil flap 11a to move angle $k_2 g_2$ up.

Hence it will be appreciated that the system shown in the embodiments enables the control of foil flaps to achieve a reduction of the heaving motion of the hydrofoil, this being defined as the vertical acceleration of its centre of gravity, and a reduction of the pitching motion of the hydrofoil, this being defined as its angular velocity about an axis perpendicular to the plane of symmetry of the hydrofoil.

Parts in FIGURES 3a and 3b similar to those in FIGURE 1 are similarly referenced.

FIGURES 3a and 3b show a modified hydrofoil vehicle having a hull 13 supported on adjustable bow and stern foils 26 and 27 respectively. Housed in the hull 13 of the hydrofoil vehicle is a vertical acceleration accelerometer 14 (for detecting oscillation of the vehicle in the heaving mode) and a pitch rate gyroscope 15 (for detecting the oscillation of the vehicle in the pitch mode) both positioned substantially at the centre of gravity of the vehicle. A further vertical acceleration accelerometer 14a is mounted in the bow of the vehicle so as to provide a measure of the transient movement of the bow foil 26. A roll rate gyroscope 25 is also housed in the hull 13 substantially at the centre of gravity of the vehicle so as to provide an output representative of the angular velocity in the roll mode, i.e. the roll rate of the vehicle.

Figure 2:
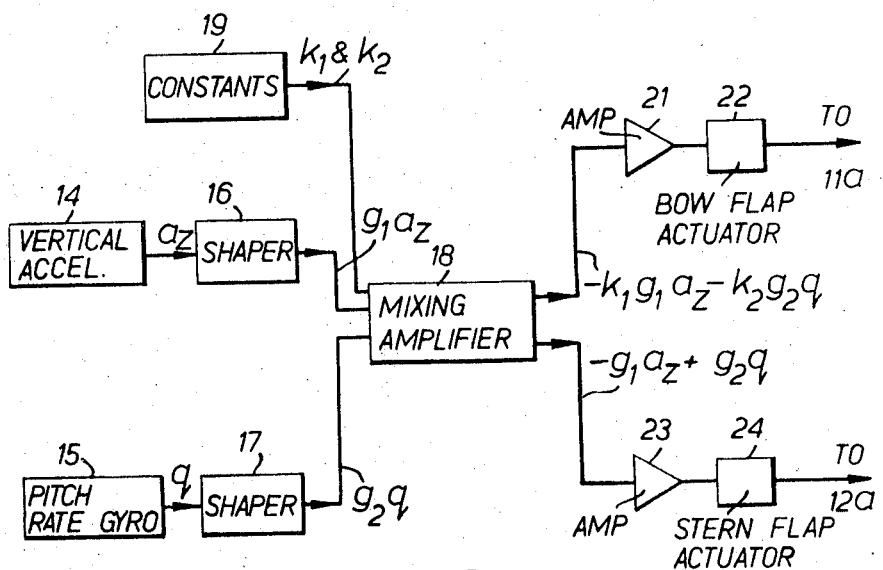
FIGURE 2 shows a block diagram of a stabilizing system incorporated in the hydrofoil vehicle of FIGURE 1.

Referring now to FIGURE 4, there is shown a block schematic representation of a system for the stabilization of the hydrofoil vehicle shown in FIGURES 3a and 3b, parts similar to those in FIGURE 2 being similarly referenced.

The accelerometer 14a and the roll rate gyroscope 25 are connected respectively through shapers 27 and 28 to a mixing amplifier assembly 18. The shaper 16 has a transfer function $G_1$ providing a 90° phase lag on the output $a_z$ at a frequency depending on the natural frequency of the vehicle in heave. This ensures that at frequencies of wave-forcing below the natural frequency in heave, the $a_z$ term increases the heave stiffness to ensure that the vehicle follows the contours of the long waves and does not impact. At frequencies approximating to the natural frequency in heave, the shaper 16 approximately integrates $a_z$ so that the heave damping is increased near the resonant frequency.

The shapers 17 and 28 of the pitch and roll rate gyroscopes respectively have complex transfer functions $G_3$ and $G_4$.

The shaper 27 has a D.C.-blocked lag transfer function $G_2$ with the time constant arranged so that at frequencies of the order of the natural frequency in pitch, the pitch stiffness of the vehicle is reduced by the $a_b$ term so that pitch acceleration in seas of wavelengths comparable with the length of the vehicle are minimized.

The arrangement 19 provides scaling constants $k_1$ to $k_6$ for the mixing amplifier arrangement 18. The arrangement 19 may form part of the mixing amplifier arrangement 18 itself: for example, as shown in FIGURE 5 it can simply consist of a number of adjustable preset potentiometers in the mixing amplifiers.

FIGURE 5 shows the shapers 16, 17, 27 and 28 as comprising amplifiers with resistance and capacitance feedback loops. The outputs from the four shapers are fed into the mixing amplifier arrangement 18. The output from the shaper 16 is fed to a first amplifier $A_1$ which has a variable potentiometer $P_1$ in its feedback loop for setting the constant $k_1$. The output from the amplifier $A_1$ is then fed in parallel to two adding amplifiers $A_{BP}$ and $A_{BS}$. The output from the shaper 16 is also fed to a second amplifier $A_2$, which has a variable potentiometer $P_5$ in its feedback loop for setting the constant $k_2$. The output from the amplifier $A_2$ is fed in parallel to two adding amplifiers $A_{SP}$ and $A_{SS}$.

The outputs from the shapers 27 and 17 are first combined in an adding amplifier $A_3$. A first output from amplifier $A_3$ is fed to a further amplifier $A_4$, which has a variable potentiometer $P_2$ in its feedback loop for setting the constant $k_2$. The output from the amplifier $A_4$ is fed in parallel to be added to the inputs of amplifiers $A_{BP}$ and $A_{BS}$. A second output from the amplifier $A_3$ is fed through a variable potentiometer $P_6$, which sets the constant $k_6$. The potentiometer output is fed in parallel to be added to the inputs of the amplifiers $A_{SP}$ and $A_{SS}$.

A first output from the shaper 28 is fed to an amplifier $A_5$ which has a variable potentiometer $P_4$ in its feedback loop for setting the constant $k_4$. The output from the amplifier $A_5$ is fed in parallel to be added to the inputs of the amplifiers $A_{BS}$ and $A_{SS}$. The second output from the shaper is fed through a potentiometer $P_3$ which sets the constant $k_3$. The output from the potentiometer $P_3$ is fed in parallel to be added to the inputs of the amplifiers $A_{BP}$ and $A_{SP}$.

The outputs of the four amplifiers $A_{BP}$, $A_{BS}$, $A_{SP}$ and $A_{SS}$ are further amplified by respective servo amplifiers $S_{BP}$, $S_{BS}$, $S_{SP}$ and $S_{SS}$ which in turn feed their corresponding actuators.

The mixing amplifier arrangement in block 18 of FIGURE 2 has the same general form as the circuit described in conjunction with FIGURE 5 with the modifications necessary in view of the fact that it responds only to pitch and heave signals.

The scaling constants and the shaper time constants can be set at their optimum values after trial runs of the hydrofoil vehicle. During a trial one or more of the accelerometers or gyroscopes can be disconnected and periodic or transient disturbances fed into an appropriate channel so that the hydrofoil vehicle is forced artificially to perform a particular motion. Thus by appropiate adjustment of the scaling constant $k_1$ to $k_6$ be can be ensured that signals injected into the heave accelerometer channel alone only force the hydrofoil in heave, and signals injected into the roll and pitch channels respectively only force the hydrofoil in roll and pitch. When this condition has been achieved small adjustments to the predicted values of the shaper time constants may be made to optimise performance of the stabillization system. Four output signals $D_{BP}$, $D_{BS}$, $D_{SP}$ and $D_{SS}$ respectively controlling the bow-port foil actuator 30, the bow-starboard foil actuator 31, the stern-port foil actuator 32 and the stern-starboard foil actuator 33, where $$D_{BP} = -k_1 G_1 a_z - k_2 (G_3 q - G_2 a_b) - k_3 G_4 p$$
$$D_{BS} = -k_1 G_1 a_z - k_2 (G_3 q - G_2 a_b) + k_3 G_4 p$$
$$D_{SP} = -k_5 G_1 a_z + k_6 (G_3 q - G_2 a_b) - k_4 G_4 p$$
$$D_{SS} = -k_5 G_1 a_z + k_6 (G_3 q - G_2 a_b) + k_4 G_4 p$$

Hence the arrangement shown provides improved crew and passenger comfort when operating in all sea states.

It will be appreciated that many changes can be made from the arrangement shown without departing from the invention. For example, instead of the trailing edge flaps on the foils 11 and 12 or the variable foils 26 and 27, other lift-varying controls could be fitted.

Furthermore, the vertical accelerometer mounted at the centre of gravity of the hydrofoil vehicle can be positioned or below the centre of gravity or could be replaced by a number of vertical accelerometers which together give required signal. A number of bow and/or stern foil flaps may be provided for each foil in which case the power amplifier actuators may be correspondingly increased in number, and the flaps on a particular foil may not necessarily be deflected equally.

What I claim is:

1. In a hydrofoil vehicle having first, second, third, and fourth adjustable foils, a stabilisation system comprising
a first accelerometer mounted substantially at the centre of gravity of the hydrofoil vehicle to sense motion in heave,
a second accelerometer mounted adjacent a said adjustable foil, to sense motion in heave and pitch,
a pitch rate gyroscope mounted substantially at the centre of gravity of the hydrofoil vehicle to sense motion in pitch, a roll rate gyroscope mounted substantially at the centre of gravity of the hydrofoil vehicle to sense motion in roll, a first shaper for shaping the output of the first accelerometer, a second shaper for shaping the output of the second accelerometer, a third shaper for shaping the output of the pitch rate gyroscope, a fourth shaper for shaping the output of the roll rate gyroscope, combining means for combining the outputs of the first, second, third and fourth shapers in different proportions to provide first, second, third and fourth demand signals representative of the desired positions of respective ones of said first, second, third and fourth adjustable foils, and actuator means responsive to said first, second third and fourth demand signals to vary said first, second, third and fourth foils respectively in dependence thereon to tend to reduce movement of the hydrofoil vehicle in heave, pitch and roll.

2. A hydrofoil vehicle according to claim 1 in which said first and second foils are mounted adjacent the bow of the vehicle on opposite sides thereof and in which the third and fourth foils are mounted adjacent the stern of the vehicle on opposite sides thereof.

References Cited

UNITED STATES PATENTS

| | | | |
|---|---|---|---|
| 3,374,966 | 3/1968 | Howard | 244—76.8 |
| 3,073,553 | 1/1963 | Coleman et al. | 244—77 |
| 3,156,209 | 11/1964 | Ask | 114—66.5 |
| 3,175,526 | 3/1965 | Johnson et al. | 114—66.5 |

ANDREW H. FARRELL, Primary Examiner